United States Patent [19]

Chamberlain

[11] Patent Number: 4,630,441
[45] Date of Patent: Dec. 23, 1986

[54] ELECTROHYDRAULIC ACTUATOR FOR AIRCRAFT CONTROL SURFACES

[75] Inventor: Theron R. Chamberlain, Redmond, Wash.

[73] Assignee: The Boeing Company, Seattle, Wash.

[21] Appl. No.: 646,755

[22] Filed: Sep. 4, 1984

[51] Int. Cl.[4] ............................................. F16D 31/02
[52] U.S. Cl. ...................... 60/413; 60/391; 91/420
[58] Field of Search .................. 91/420; 60/390, 391, 60/413

[56] References Cited

U.S. PATENT DOCUMENTS

| | | | |
|---|---|---|---|
| 3,133,503 | 5/1964 | Sheler | 103/49 |
| 3,636,708 | 1/1972 | Karman | 60/52 |
| 3,747,351 | 7/1973 | Wilkerson et al. | 91/420 |
| 3,772,889 | 11/1973 | Mason et al. | 60/473 |
| 3,892,165 | 7/1975 | Lioux | 91/420 |
| 3,902,318 | 9/1975 | Becker et al. | 60/391 |
| 4,041,704 | 8/1977 | Gygli | 60/473 |
| 4,085,587 | 4/1978 | Garlinghouse | 60/413 |
| 4,168,611 | 9/1979 | Woyton et al. | 60/413 |
| 4,204,584 | 5/1980 | de Maight | 60/413 |

Primary Examiner—A. Michael Chambers
Attorney, Agent, or Firm—Bruce A. Kaser; Delbert J. Barnard

[57] ABSTRACT

This invention relates to small-sized electrohydraulic actuators for use in adjusting aircraft control surfaces. A problem associated with such actuators is that they must be of a light-weight and efficiently packaged design. The present invention is designed to operate at relatively low hydraulic pressures. A balanced, double-acting hydraulic ram (10), connectable between a support (14) and a member to be moved relative to the support, includes a cylinder (18) divided into first and second chambers (20, 22) by a movable piston (19). A pump (26) having high and low pressure ports (38, 40) is connected to the cylinder (18) by first and second conduits (42, 44). A third conduit (48) connects an accumulator (46) to the first and second conduits (42, 44). A valve (52) is positioned in the third conduit (48), and blocks high pressure flow from a high pressure port in the pump to the third conduit (48). At the same time, the valve (52) permits the accumulator (46) to provide leakage makeup flow through the third conduit (48) to the low pressure port of the pump.

12 Claims, 3 Drawing Figures

ELECTROHYDRAULIC ACTUATOR FOR AIRCRAFT CONTROL SURFACES

DESCRIPTION

1. Technical Field

This invention pertains to small-sized, efficiently packaged electrohydraulic actuators for use aboard aircraft, and in particular, small-sized actuators which are designed to be hydraulically independent from other units and/or a main hydraulic system aboard an aircraft.

2. Related Application

This application is related to another separate application entitled "Electric Integrated Actuator With Variable Gain Hydraulic Output", filed by C. William Clay and Curtiss W. Robinson on 12/28/84. The serial umber for this other application is Ser. No. 687,198.

3. Background Art

Aircraft designers are constantly searching for new ways to make aircraft components lighter in weight and smaller in size. This search has included attempts to redesign those components that actuate aircraft ailerons, elevators, and other similar control surfaces. In the past, actuating aircraft control surfaces included the utilization of a hydraulic actuator, or actuators, for each surface, with the actuator(s) being connected to a main hydraulic system in the airfcraft. Actuators would, for example, be connected to the main system by valves, with each actuator receiving pressurized hydraulic fluid from the system in accordance with the amount of fluid required the adjust a particular control surface. This type of system has been found to be undesirable from a weight standpoint in that it involves having a complex network of hydraulic conduits distributed throughout the aircraft to those locations where there are hydraulic actuators and control surfaces. Accordingly, aircraft designers have made various attempts to improve on this type of system. One of such attempts has included the development of all-electric actuators that do not utilize hydraulics, thereby eliminating the main hydraulic system. Other attempts have included the design and development of small-sized hydraulic actuators that are independent units. i.e., actuators wherein the hydraulics are self-contained within the actuator itself. For example, such an actuator may include a balanced, double-acting hydraulic ram connected by conduits to a reversible variable speed electrically driven fixed displacement pump, all of which can be packaged as a single unit. This type of actuator does not utilize pressurized hydraulic fluid from a main system since it has an independent pump for providing pressurized fluid to the actuator. The invention of the present case is of this latter type.

Those United State patents which are known to be pertinent to the present invention are as follows: U.S. Pat. No. 3,133,503, granted to Sheler on May 19, 1964; U.S. Pat. No. 3,636,708, granted to Karman et al on Jan. 25, 1972; U.S. Pat. No. 3,722,889, granted to Mason et al on Nov. 20, 1973; and U.S. Pat. No. 4,041,704, granted to Gygli on Aug. 16, 1977.

DISCLOSURE OF THE INVENTION

The present invention provides an electrohydraulic actuator for use aboard an aircraft. The actuator includes a balanced, double-acting hydraulic ram that is connectable between a supporting structure and a member that is to be moved relative to the supporting structure. The ram comprises a cylinder and a movable piston that is received within the cylinder. The piston divides the cylinder into first and second chambers, with one chamber being located on each side of the piston. Different hydraulic pressures in each chamber, caused by a pumping means, results in the piston moving back and forth in the cylinder. The pumping means includes a high pressure outlet port and a low pressure inlet port, and is characterized in that such ports are reversible according to the direction in which the pumping means is driven. A reversible variable drive electric motor, connected to the pumping means, is provided for driving the pumping means to provide variable flow output.

The high pressure port of the pumping means may be connected to the first cylinder chamber by a first conduit means which provides a fluid flow path for communicating hydraulic fluid between such port and such chamber. The low pressure port is connected to the second cylinder chamber by a second conduit means. In a fashion similar to the first conduit means, the second conduit means provides a fluid flow path between the low pressure port and the second cylinder chamber.

The actuator also includes an accumulator means for providing a pressurized source of leakage makeup fluid to various actuator components. The accumulator means also provides a low quiescent pressure for the fluid in the actuator when the actuator is in a substantially on-operative condition. The accumulator means may be connected to both the first and second conduit means by a third conduit means. The accumulator means provides hydraulic fluid leakage makeup flow to the first and second conduit means at a pressure that is substantially the same as the pressure of the low pressure port of the pumpoing means.

A valve means, positioned in the third conduit means, is provided to block high pressure flow issuing out of the high pressure port of the pumping means outlet from being communicated from the first to the third conduit means. The valve means at the same time will permit leakage makeup flow to be communicated from the accumulator means by the third conduit means to the second conduit means. When the high and low pressure ports of the pumping means ports are reversed, i.e., the direction of the electric motor is reversed and high pressure flow is output into the second conduit means instead of the first, the valve means then operates in an opposite sense to block high pressure flow from the second conduit means into the third conduit means. Furthermore, the valve means then permits leakage makeup flow from the accumulator means to be communicated by the third conduit means into the first conduit means.

The pumping means may include a rotor chamber having a pump rotor received therein. The pump rotor may be in a form such that it includes a circular array of axial pumping chambers, with a pumping piston being slidably received for reciprocal movement within each respective chamber. A cam means, positioned at a first end of the rotor chamber, operates to reciprocate the pump pistons back and forth within their respective cylinders in response to rotor rotation. The pumping means further includes a port means that leads out from the pump cylinders, with such port means being located at a second end of the rotor. A fourth conduit means may be provided for the purpose of defining a fluid flow path from the accumulator means to the rotor chamber.

The purpose of this path would be to provide fluid makeup for fluid leakage in the pumping means.

In one embodiment of the invention, the valve means may comprise a two-way shuttle valve. Such a shuttle valve may have first and second valve seats, with one each of the seats being at opposing ends of an elongated passageway. First and second valve members, connected together by an elongated linkage member, may be shaped to fit within the first and second valve seats, respectively. The length of the linkage member will be greater than the length of the elongated passageway so that only one of the valve members may be seated within its respective valve seat at any one particular time.

One of the advantages of the present invention is that it provides an electrohydraulic actuator that is efficiently packaged, making it suitable for use in space-limited areas of aircraft. For example, the pump housing, the accumulator means, and the electric motor may all be mounted on and carried by the actuator cylinder. It is possible, for example, to attach the pump housing directly to a side portion of the cylinder body. In preferred form, the electric motor has a rotary output that is directly connected to a rotary input of the rotor of the pump. Therefore, the electric motor may be attached directly to the pump housing. To further promote efficient packaging of the actuator, the electric motor may be in the form of a brushless DC motor, and the accumulator means may be in the form of a gas pressure charged accumulator. Such a motor and accumulator could be sized for easy attachment to the side of the actuator cylinder.

Another advantage of the present invention is that it provides an actuator wherein a minimal amount of heat is generated when the actuator is in a substantially on-operative or quiescent condition.

The above features and advantages of the present invention will become more readily apparent and better understood upon reading the best mode for carrying out the invention which follows.

BRIEF DESCRIPTION OF THE DRAWINGS

Referring now to the accompanying drawings, which are for descriptive purposes only, like reference numerals refer to like parts throughout, and.

BEST MODE FOR CARRYING OUT THE INVENTION

Figure 1:
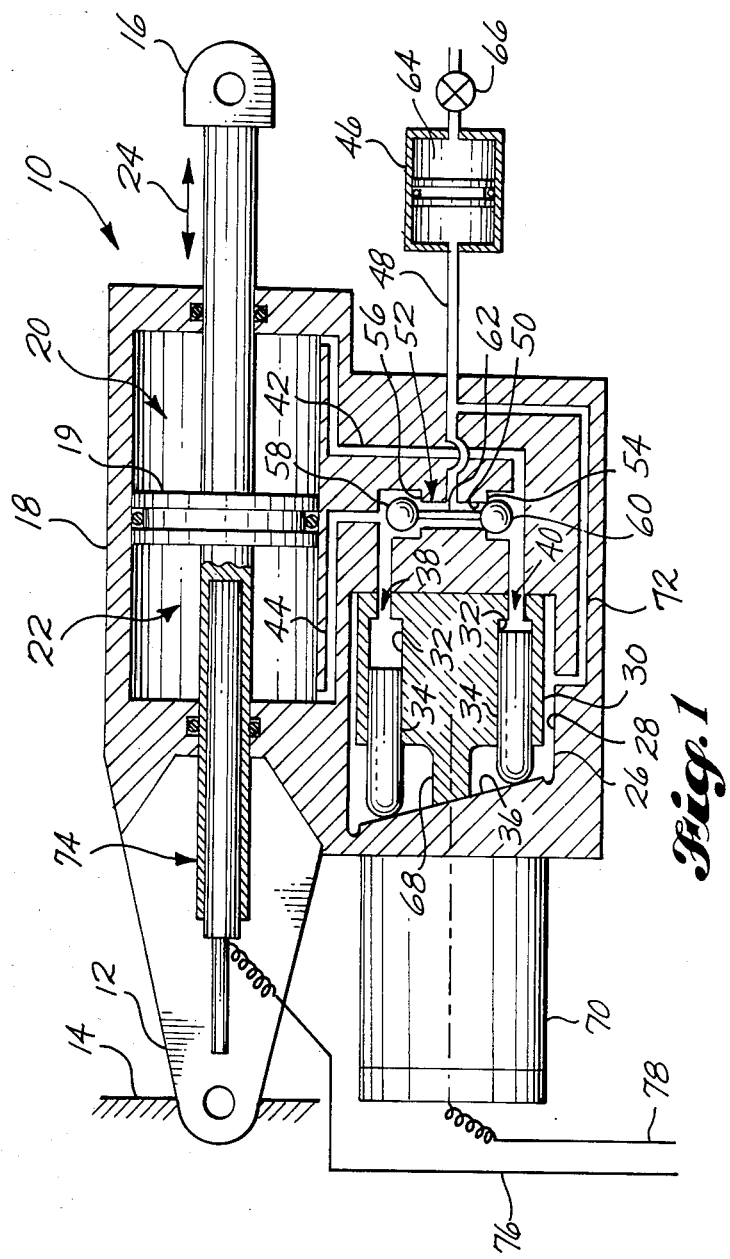
FIG. 1 is a schematic view of a small-sized electrohydraulic actuator constructed in accordance with a preferred embodiment of the present invention, and shows a sectional view of a balanced, double-acting hydraulic ram, and an electrically powered reversible pump connected to the ram by conduits, and further shows a gas charged accumulator connected to such conduits.

Referring now to the drawings, therein is shown in FIG. 1 an electrohydraulic actuator indicated generally by reference numeral 10. The actuator 10 is connected at one end 12 to a supporting structure 14. Another rod end 16 of the actuator is extendible and retractable relative to the supporting structure 14 for moving another member relative to the supporting structure. The actuator 10 includes a cylinder body 18 that houses a movable piston 19 that is slidably received therein. The piston 19 divides the actuator cylinder 18 into first and second chambers, indicated generally by reference numerals 20 and 22, respectively. The chambers 20, 22 contain hydraulic fluid. A pressure difference between the fluid in chambers 20 and 22 causes the piston 19 to move back and forth in the directions indicated by arrow 24. This, in turn, causes the rod end 16 of the actuator to extend and retract relative to the cylinder body 18. The above-described configuration is, of course, well-known to those skilled in the art to which the present invention pertains.

In accordance with the present invention, the electrohydraulic actuator 10 includes a pumping means in the form of a typical fixed displacement swash plate type axial piston pump 26. The pump 26 may include a pump housing that defines a rotor chamber 28. Received within the rotor chamber 28 is a pump rotor 30, sometimes referred to in the art as a cylinder block, having a circular array of axial pumping chambers 32. Only two of such chambers are shown in FIG. 1 A pumping piston 34 is slidably received within each pumping chamber 32. Located at a first end of the rotor chamber 28 is a cam means that is typically in the form of a swash plate 36, as is indicated schematically in FIG. 1. The swash plate 36 causes the pumping pistons 34 to reciprocate back and forth within the pumping chambers 32 as the rotor 30 rotates inside the rotor chamber 28. A first and a second port, indicated generally by arrows 38 and 40, lead from the pump cylinders and provide a low pressure inlet port and a high pressure outlet port for the pump 26, respectively. The pump 26 will be reversible, i.e., the port which acts as either an outlet or inlet port will depend on the direction of rotation of the pump. The construction of the pump 26 would be well-known to a person skilled in the art, and has been described in various publications and patents including: *Hydraulic System Analysis* by George R. Keller, published by the Editors of Hydraulics and Pneumatics Magazine (Library of Congress Catalog No: 78-52991).

For the purpose of better understanding the description of the invention which follows, assume the pump 26 is rotating in a direction such that port 40 is a high pressure outlet port, and port 38 is a low pressure inlet port. A conduit 42 provides a fluid flow path between the pump outlet 40 and the first cylinder chamber 20. A second conduit 44 provides a fluid flow path between the low pressure inlet port 38 and the second cylinder chamber 22. When the pump 26 is operating, the pump draws hydraulic fluid from chamber 22 through inlet port 38 and outputs high pressure flow through port 40 to chamber 20. This would cause the above-mentioned pressure difference between chambers 20 and 22, with chamber 20 having a higher pressure relative to that of chamber 22. The higher pressure in chamber 20 would cause the piston 19 to move in a direction that is from right to left. It goes without saying that if the operation of the pump 26 was to be reversed, the pressure difference between the chambers 20 and 22 would also be reversed, thereby causing the piston 19 to move in a direction from left to right. It is to be understood, therefore, that depending on the direction of pump rotation, the rod end 16 of the actuator 10 extends and retracts in the directions indicated by arrow 24. This type of pump/cylinder arrangement would also be familiar to a person skilled in the art, and has been taught in a variety of publications and patents including U.S. Pat. No. 4,041,704, issued to Walter Gygli on Aug. 16, 1977.

In preferred form, an accumulator 46 is connected to the first and second conduits 42, 44 by means of a third conduit 48 that includes an elongated passageway 50. The passageway 50 provides a fluid flow communication path from the third conduit to both of the first and second conduits 42, 44. The accumulator 46 provides a pressurized source of leakage makeup fluid to the actuator 10, and also provides a quiescent pressure to the actuator. In preferred form, the accumulator 46 may, for example, be a gas pressure charged accumulator wherein pressurized gas is provided to a chamber 64 in the accumulator by means of a valve 66.

In the embodiment shown in FIG. 1, a valve means in the form of a shuttle valve (indicated generally by arrow 52) is positioned in the elongated passageway 50. The shuttle valve 52 includes first and second valve seats 54, 56 which are positioned at opposing ends of the elongated passageway 50. A pair of valve members 58, 60 are connected together by an elongated linkage member 62 that extends through the passageway 50. The length of the linkage member 62 will be greater than the length of the passageway 50 so that only one of the valve members 58, 60 will be seated in a valve seat 54, 56 at any particular time. For example, FIG. 1 shows valve member 60 seated in valve seat 54, with valve member 58 being in an inseated position relative to valve seat 56. The valve members 58, 60 may, for example, be of a spherical shape, and the valve seats 54, 56 will be shaped so that the valve members fit snugly adjacent the valve seats. The linkage member 62 may consist of no more than a rod extending through the passageway 50 and connecting the two valve members 58, 60 together. A shuttle valve having this type of construction would be, of course, well-known to a person skilled in the art to which the present invention pertains.

In FIG. 1, a high pressure flow output from port outlet 40 into conduit 42 will cause valve member 60 to be seated in valve seat 54. This will block flow from the first conduit 42 into the elongated passageway 50, and the second and third conduits 44, 48. Since the linkage or rod member 62 is longer than the passageway 50, the valve member 58 will be unseated relative to the valve seat 56. This permits leakage makeup flow from the accumulator 46 to be communicated by the third conduit 48 into the low pressure inlet port 38.

If rotation of the pump rotor 30 in one direction would cause a high pressure flow to be output into the first conduit 42, then reversing the direction of pump rotation would cause a high pressure flow to be output through pump port 38 into the second conduit 44. This would push the valve member 58 into a seating relationship with the valve seat 56, thereby blocking high pressure flow from the second conduit 44 into both the first and third conduits 42, 48. Valve member 60 would no longer be in a seated relationship with valve seat 54, and fluid flow from the accumulator 46 would be communicated through the third conduit 48 into port 40, which in this case would now be acting as a low pressure inlet port.

The rotor 30 of the pump 26 may have a rotary input shaft 68 connected to a rotary output shaft of an electric motor 70. However, such output shaft is not shown in the drawings. The electric motor 70 will be reversible so that it can drive the pump in any one of two rotational directions for extending and retracting the end 16 relative to the cylinder 18.

In accordance with a preferred embodiment of the present invention, a fourth conduit 72 may connect the third conduit 48, and the accumulator 46, to the rotor chamber 28. The conduit 72 would provide a fluid flow path between the accumulator 46 and the rotor chamber 28 to permit leakage in the pump to be recirculated from rotor chamber 28 back to the accumulator 46. Such leakage, for example, may be in the form of leakage between the pumping pistons 34 and the axial pumping chambers 32, or leakage through various seals in the pump 26.

The position of the rod end 16 of the actuator 10 may be monitored by a linear variable displacement transducer (LVDT) 74. The LVDT 74 would send a rod end displacement signal through line 76 to a control cicruit (not shown in the drawings), indicating to the control circuit the position of the rod end 16 at all times. The control circuit would send control signals, including control signals responsive to LDVT signals, through line 78 to the motor 70. The control signals would activate the pump 26 for the purpose of extending and retracting the rod end 16, or for compensating against forces that may be acting on the rod end. This kind of configuration would be familiar to a person skilled in the art.

Figure 2:
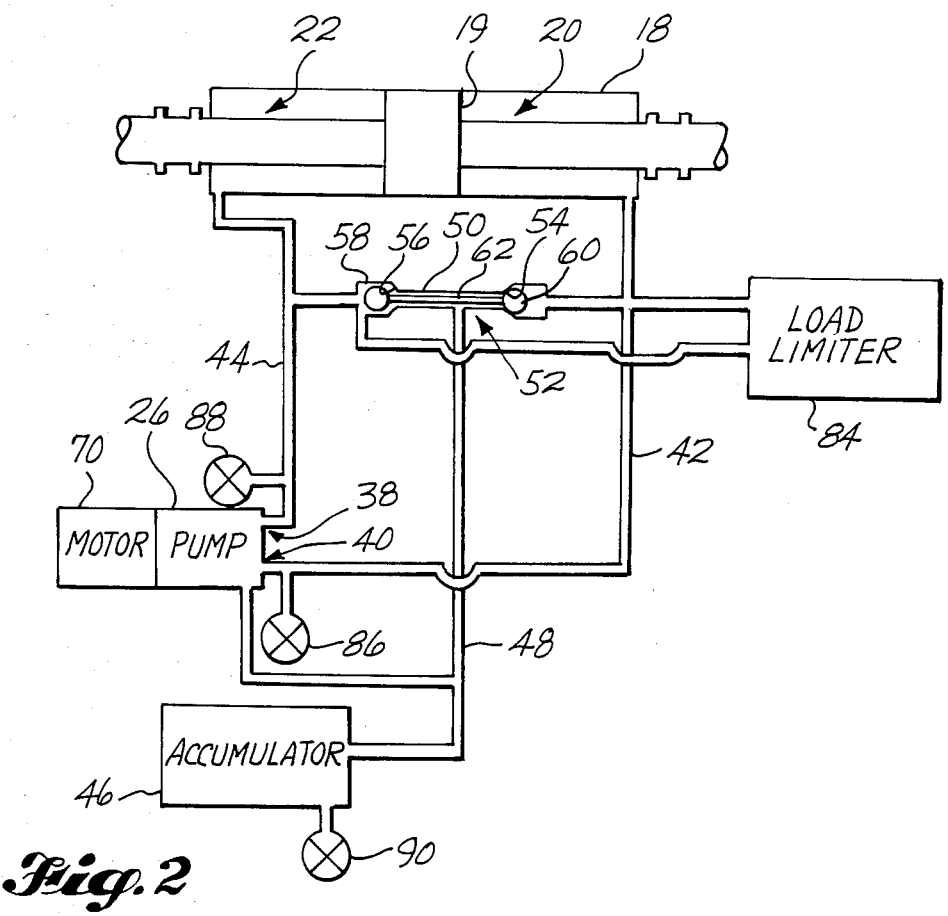
FIG. 2 is a schematic view of an actuator like that shown in FIG. 1, but shows a load limiter connected to the conduits that connect the pump to the ram.

As is shown in FIG. 2, the actuator 10 may be provided with a load limiter 84 connected to conduits 42, 44 for the purpose of relieving excessive pressure in the conduits. Various ports, such as ports 86 and 88 may also be provided in the conduits 42, 44 for the purpose of bleeding the conduits if it should be necessary. The accumulator 46 may also be provided with a fill inlet check port 90.

Reducing the size and weight of aircraft components is always a prime concern of aircraft designers. An advantage of an electrohydraulic actuator in accordance with the present invention is that it provides an efficiently packaged actuator that operates with minimal power input and can be light-weight in construction. For example, the actuator of the present case may be designed to operate at relatively low hydraulic pressures in comparison to other actuators known in the art. The pump output pressure from the high pressure port must only be equal to that pressure which would be required to balance the load on the actuator. Typically, the high and low pressure ports of the pump may operate in a range between 100 and 3000 psi. The accumulator may provide leakage makeup fluid at a pressure equal to the low pressure port of the pump. Therefore, the accumulator may provide hydraulic fluid to the actuator at a pressure which is also 100 psi. By way of comparison, most actuators known in the art that employ balanced, double-acting hydraulic rams are supplied with pressurized hydraulic fluid from pumps operating continuously to supply fluid at a certain pressure, such as 3000 psi, for example. A servovalve arrangement would then be used to regulate flow and pressure from the pump to the actuator. An advantage of the present invention is that the electrical power required by the motor is reduced since in the present invention the motor operates only a sufficient amount to balance the load on the actuator.

Figure 3:
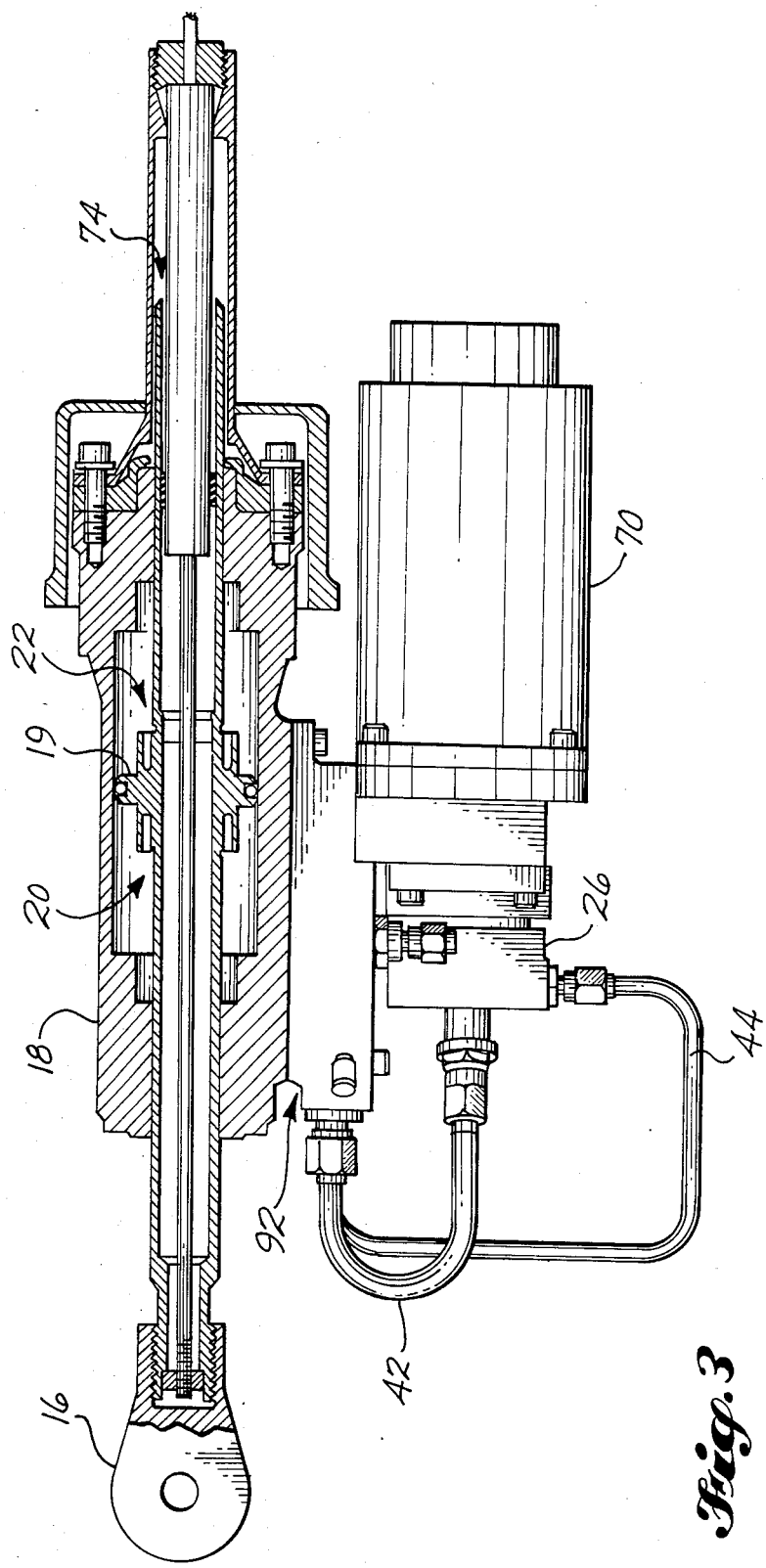
FIG. 3 is a view of an actuator constructed in accordance with a preferred embodiment of the invention, and shows a balanced, double-acting hydraulic ram in cross section connected by conduits to an electrically powered reversible pump, wherein the pump and conduits are shown in pictorial form mounted to the side of the actuator.

Another advantage of an actuator in accordance with the present invention is that such an actuator may be efficiently packaged to fit in a space-limited area. For example, as is shown in FIG. 3, the pump 26, the accumulator (not shown in this Fig.), and the electric motor 70 may all be attached to the side of the cylinder 18. A manifold, indicated generally by arrow 92, may be provided for connecting the pump 26 and motor 70 to the cylinder 18. The shuttle valve is not shown in this drawing. The pump 26 may, for example, be driven by an electric motor 70 such as a brushless DC motor. Such motors are typically small in size, and are readily adaptable for use on an actuator constructed in accordance with this invention.

Another advantage of the present invention is that actively controlled valves are not used to govern flow between the accumulator 46 and the conduits 42, 44. Valves used in accordance with the present invention, whether they be in the preferred form of a single shuttle valve, as shown in FIGS. 1 and 2, or a pair of one-way check valves, will operate entirely passively thereby making for a much simpler electrohydraulic actuator system.

The best mode for carrying out the invention as described above is not to be used for the purpose of limiting the invention. Other embodiments of the invention are possible without departing from the spirit and scope thereof. The scope of the invention is to be determined solely by the appended claims which follow, in accordance with established doctrines of patent claim interpretation.

What is claimed is:

1. An improved electrohydraulic actuator for use aboard an aircraft, said actuator being of a type including a balanced, double-acting hydraulic ram connectable between a support and a member to be moved relative to said support, such ram having a cylinder and a movable piston received within the cylinder, said piston dividing the cylinder into first and second chambers, one on each side of said piston, said actuator further comprising:

a fixed displacement pump, the operative rotation of which is reversible, and having a pair of ports, said pump being characterized in that one of said ports acts as a pump outlet and the other of said ports acts as a pump inlet, and vice versa, depending on the direction of rotation of said pump, wherein said port acting as an outlet outputs hydraulic fluid at a certain outlet pressure;

a reversible variable drive electric motor drivingly connected to said pump;

a first conduit unobstructedly connecting one of said pump ports to one of said cylinder chambers, for providing an uninterrupted fluid flow path between said one port and said one chamber;

a second conduit unobstructedly connecting the other of said pump ports to the other of said cylinder chambers, for providing an uninterrupted fluid flow path between said other port and said other chamber;

a third conduit interconnecting said first and second conduits;

an accumulator means, connected to said third conduit, for delivering pressurized hydraulic fluid thereto, at a pressure less than said pump outlet pressure; and valve means, positioned in said third conduit, for blocking pump outlet flow in one of said first and second conduits from flowing into the other of said first and second conduits, and for at the same time permitting hydraulic fluid flow from said accumulator means to be communicated into said other conduit.

2. An electrohydraulic actuator in accordance with claim 1, wherein said pump comprises a pump housing including a rotor chamber and a rotor received within said rotor chamber, said rotor including a circular array of axial pumping chambers, with a pumping piston being in each pumping chamber, and cam means at a first end of said rotor chamber operable to reciprocate the pump pistons back and forth within the pump cylinders in response to rotation of the rotor, said pump including port means leading out from the pump cylinders at a second end of the rotor, and a fourth conduit interconnecting said accumulator means and said rotor chamber, for providing a fluid flow path from said accumulator means to said rotor chamber to provide rotor fluid leakage return to the accumulator means.

3. An electrohydraulic actuator in accordance with claim 2, wherein said valve means comprises a first one-way check valve operatively positioned relative to said third conduit to permit fluid flow only from said third to said first conduit, and a second one-way check valve operatively positioned relative to said third conduit to permit fluid flow only from said third to said second conduit.

4. An electrohydraulic actuator in accordance with claim 2, wherein said valve means comprises a two-way shuttle valve having first and second valve seats, one each of said seats being positioned at opposing ends of an elongated passageway, and first and second valve members connected together by an elongated linkage member, said first and second valve members being shaped to seat snugly adjacent said first and second valve seats, respectively, and wherein the linkage member has a length that is greater than the length of said elongated passageway so that only one of said valve members may be seated adjacent its respective valve seat at any one particular time.

5. An electrohydraulic actuator in accordance with claim 3, wherein said pump housing, said accumulator means and said electric motor are mounted on and are carried by said cylinder.

6. An electrohydraulic actuator in accordance with claim 5, wherein said pump housing is attached to a side portion of said cylinder, and said electric motor is attached to said pump housing.

7. An electrohydraulic actuator in accordance with claim 6, wherein said pump rotor includes a rotary input, and wherein said electric motor has a rotary output that is directly coupled to the rotary input of the rotor, and wherein said electric motor is a brushless DC motor.

8. An electrohydraulic actuator in accordance with claim 3, wherein said accumulator means is a gas pressure charged accumulator.

9. An electrohydraulic actuator in accordance with claim 4, wherein said pump housing, said accumulator means, and said electric motor are mounted on and are carried by said cylinder.

10. An electrohydraulic actuator in accordance with claim 9, wherein said pump housing is attached to a side portion of said cylinder, and said electric motor is attached to said pump housing.

11. An electrohydraulic actuator in accordance with claim 10, wherein said pump rotor includes a rotary input, and wherein said electric motor has a rotary output that is directly coupled to the rotary input of said pump rotor, and wherein said electric motor is a brushless DC motor.

12. An electrohydraulic actuator in accordance with claim 4, wherein said accumulator is a gas pressure charged accumulator.

* * * * *